US006628301B1

(12) United States Patent
Acton et al.

(10) Patent No.: US 6,628,301 B1
(45) Date of Patent: Sep. 30, 2003

(54) EXTENSIBLE FRAMEWORK FOR TUNING TO PROGRAMMING SOURCES

(75) Inventors: Colin L. Acton, Kirland, WA (US); Terje K. Backman, Carnation, WA (US); Jay Alan Borseth, Seattle, WA (US); David A. Goll, Seattle, WA (US); Sean C. McDowell, Redmond, WA (US); Thaddeus C. Pritchett, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/505,451

(22) Filed: Feb. 16, 2000

(51) Int. Cl.[7] .................................. H04N 7/10
(52) U.S. Cl. ......................... 345/716; 348/731
(58) Field of Search ................. 345/716, 700, 345/723, 744; 348/731, 732, 733, 554, 555, 558; 725/131, 139, 140

(56) References Cited

U.S. PATENT DOCUMENTS 5,649,285 A * 7/1997 Cautley ....................... 348/733
6,005,561 A * 12/1999 Hawkins et al. ............ 345/716
6,340,997 B1 * 1/2002 Borseth ....................... 348/731

* cited by examiner

Primary Examiner—Cao (Kevin) Nguyen
(74) Attorney, Agent, or Firm—Lee & Hayes, PLLC

(57) ABSTRACT

An extensible framework for tuning to programming sources includes tune request objects and tuning space objects that are used to maintain and pass information regarding how to tune to a particular program. The extensible framework can be easily modified by creating, deleting, or modifying tune request objects and tuning space objects without requiring changes on the part of applications interacting with the framework.

40 Claims, 7 Drawing Sheets

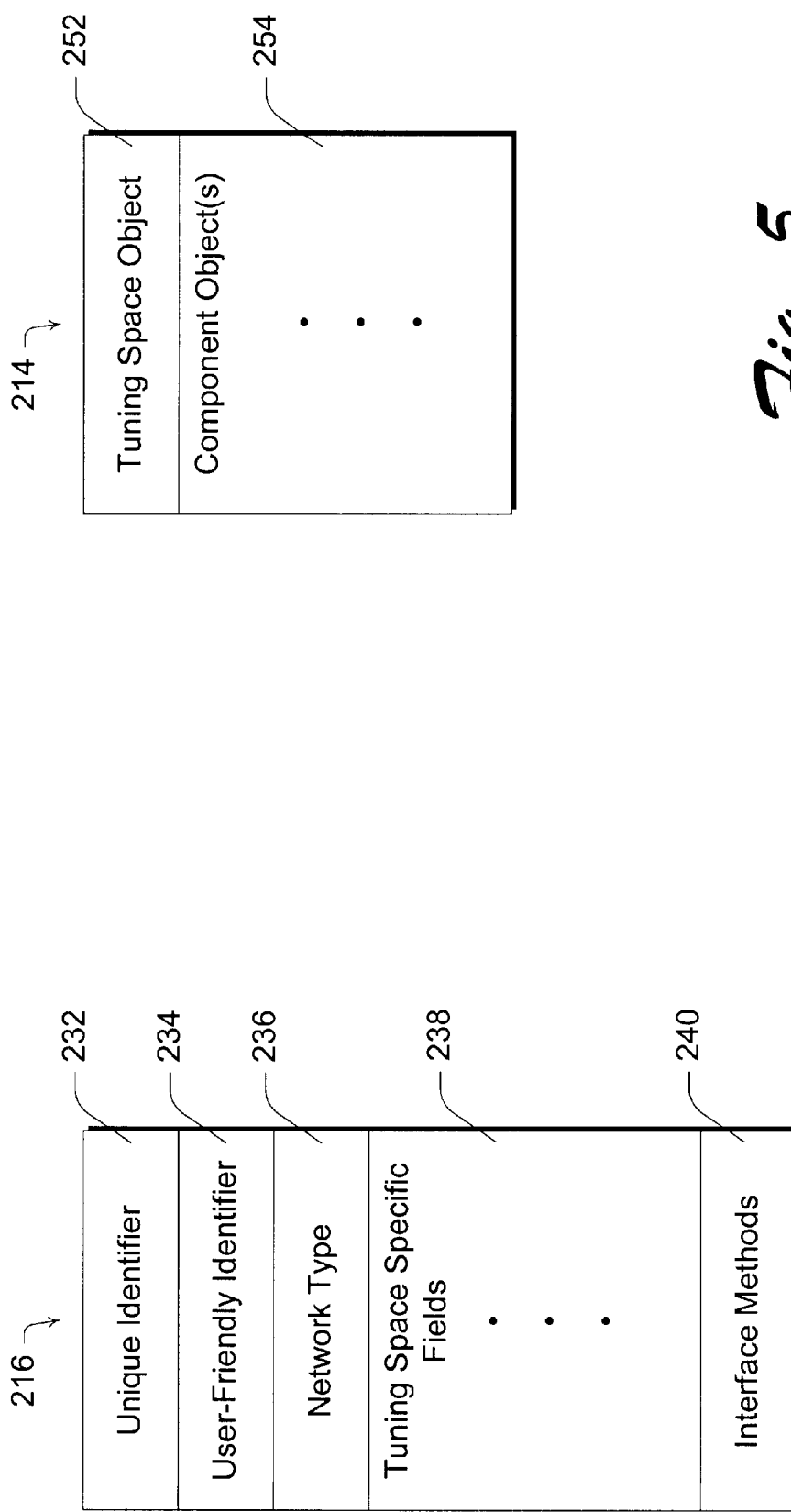

EXTENSIBLE FRAMEWORK FOR TUNING TO PROGRAMMING SOURCES

TECHNICAL FIELD

This invention relates to broadcast program tuning. More particularly, the invention relates to an extensible framework for tuning to programming sources.

BACKGROUND OF THE INVENTION

It has become common for a single video, audio, or data device to receive multimedia program content via a variety of different network types. For instance, a television may receive programming from one or more cable systems or satellite systems and also from terrestrial broadcast systems. More recent devices such as set-top boxes (STBs) and multimedia personal computers (PCs) are able to receive programming from cable systems, terrestrial broadcast systems, satellite systems, the Internet, etc.

Different application programs can be written by developers to make use of this multimedia program content. One typical example of such an application is a multimedia viewer application that allows a user to view the multimedia content on a display device.

Each network type requires that the device receiving the multimedia program content operate in a particular manner to be able to "tune to" or receive particular content. For example, a terrestrial broadcast system may require that the device tune a receiver to a particular frequency, while a satellite system may require that the device tune a receiver to a different frequency and obtain select portions of the multimedia stream provided at that frequency.

The wide variety of available network types creates problems for application developers, requiring that the developer be aware of and properly design for the tuning of each of the different transport mechanisms the application is to support. For example, a multimedia viewer application that is to be able to tune to terrestrial broadcasts, cable transmissions, and digital satellite transmissions would have to be programmed with all of the specific information necessary to tune to each one of these different network types.

Requiring such information to be programmed into the application can be troublesome for developers, requiring additional time and knowledge to be able to do so. Requiring such information to be programmed into the application further limits the application's ability to support subsequently developed transport mechanisms.

The invention described below addresses these disadvantages, providing an extensible framework for tuning to programming sources.

SUMMARY OF THE INVENTION

An extensible framework for tuning to programming sources is described herein. The extensible framework can be easily modified (such as by creating, modifying, or deleting programming sources) without requiring changes on the part of applications interacting with the framework.

According to one aspect of the extensible framework, tune request objects and tuning space objects are used to maintain and pass information regarding how to tune to a particular program. The exact nature of such information varies depending on the programming source (examples include RF frequencies, digital sub-channel identifiers, satellite locations, etc.). An application can obtain access to a particular programming source, such as to receive the multimedia content of a particular program, by interacting with the tune request objects, thereby alleviating the application of needing to have any information regarding how to tune to a particular program.

According to another aspect of the extensible framework, each tuning space object corresponds to a particular program source and includes information regarding how a tuner can tune to various programs (e.g., channels) available from that programming source. Each tune request object corresponds to a particular program available from a programming source and includes both a tuning space object corresponding to that programming source as well as information identifying the particular program (e.g., a channel number, a channel name, etc.).

BRIEF DESCRIPTION OF THE DRAWINGS

The present invention is illustrated by way of example and not limitation in the figures of the accompanying drawings. The same numbers are used throughout the figures to reference like components and/or features.

FIG. 4 is a block diagram illustrating an exemplary tuning space object in accordance with an embodiment of the invention.

FIG. 5 is a block diagram illustrating an exemplary tune request object in accordance with an embodiment of the invention.

DETAILED DESCRIPTION

Figure 1:
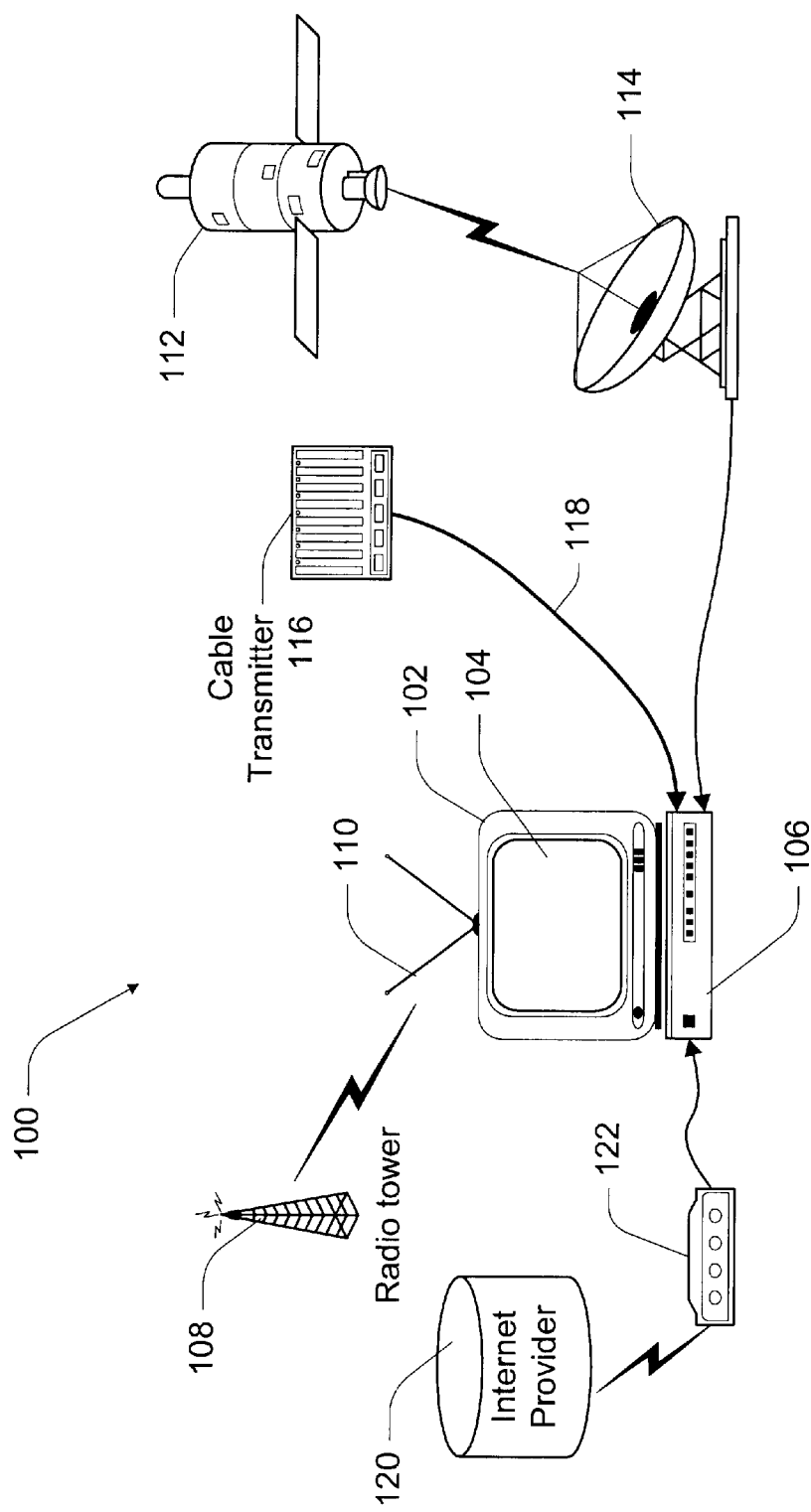
FIG. 1 shows an entertainment distribution and viewing system in accordance with one embodiment of the invention.

FIG. 1 shows an entertainment distribution and viewing system 100 in accordance with one embodiment of the invention. Entertainment system 100 includes a video and audio rendering system 102 having a display device including a viewing area 104. Video and audio rendering system 102 represents any of a wide variety of devices for playing video and audio content, such as a traditional television receiver, a personal computer, etc. Receiver 106 is connected to receive and render content from multiple different programming sources. Although illustrated as separate components, rendering system 102 may be combined with receiver 106 into a single component (e.g., a personal computer or television).

While audio and video have traditionally been transmitted using analog formats over the airwaves, current and proposed technology allows multimedia content transmission over a wider range of network types, including digital formats over the airwaves, different types of cable and satellite systems (employing both analog and digital transmission formats), wired or wireless networks such as the Internet, etc.

FIG. 1 shows several different physical sources of programming, including a terrestrial television broadcasting system 108 which can broadcast analog or digital signals that are received by antenna 110; a satellite broadcasting system 112 which can transmit analog or digital signals that are received by satellite dish 114; a cable signal transmitter 116 which can transmit analog or digital signals that are received via cable 118; and an Internet provider 120 which can transmit digital signals that are received by modem 122. Both analog and digital signals can include audio, video, and/or data. Other programming sources might be used in different situations, including interactive television systems.

Each of these programming sources broadcasts or otherwise provides one or more content sources. The most familiar example of a content source is a traditional RF television broadcast channel, which is typically occupied by a particular broadcast network such as ABC, CBS, NBC, etc. In the last several years, a great number of such broadcast networks have become available through cable television providers. Each of these broadcast content sources is associated with a particular broadcast channel, which in turn is identified by a channel number. Users become familiar with the channel designations for various content sources, and often refer to the content sources by their channel numbers, although the correspondence between content sources and channel numbers changes depending on the physical source being used—upon the geographic location and/or the service provider. In addition, broadcast channels having the same channel indicators are available from different physical signal sources. For example, channel 2 might be available from both a terrestrial broadcast signal and from a cable signal, even though channel 2 might correspond to a different network or content source in each case.

As described in more detail below, system 102 includes an extensible tuning architecture which alleviates applications executing on system 102 (such as a multimedia rendering application) from having to be knowledgeable of how to tune to programming from each of the programming sources. The extensible tuning architecture uses a combination of tuning space descriptors and tune request descriptors to maintain the information needed to tune to a particular program from a particular programming source. Applications executing on system 102 can interface with the extensible tuning architecture to tune to a particular program from a programming source, as discussed in more detail below.

Figure 2:
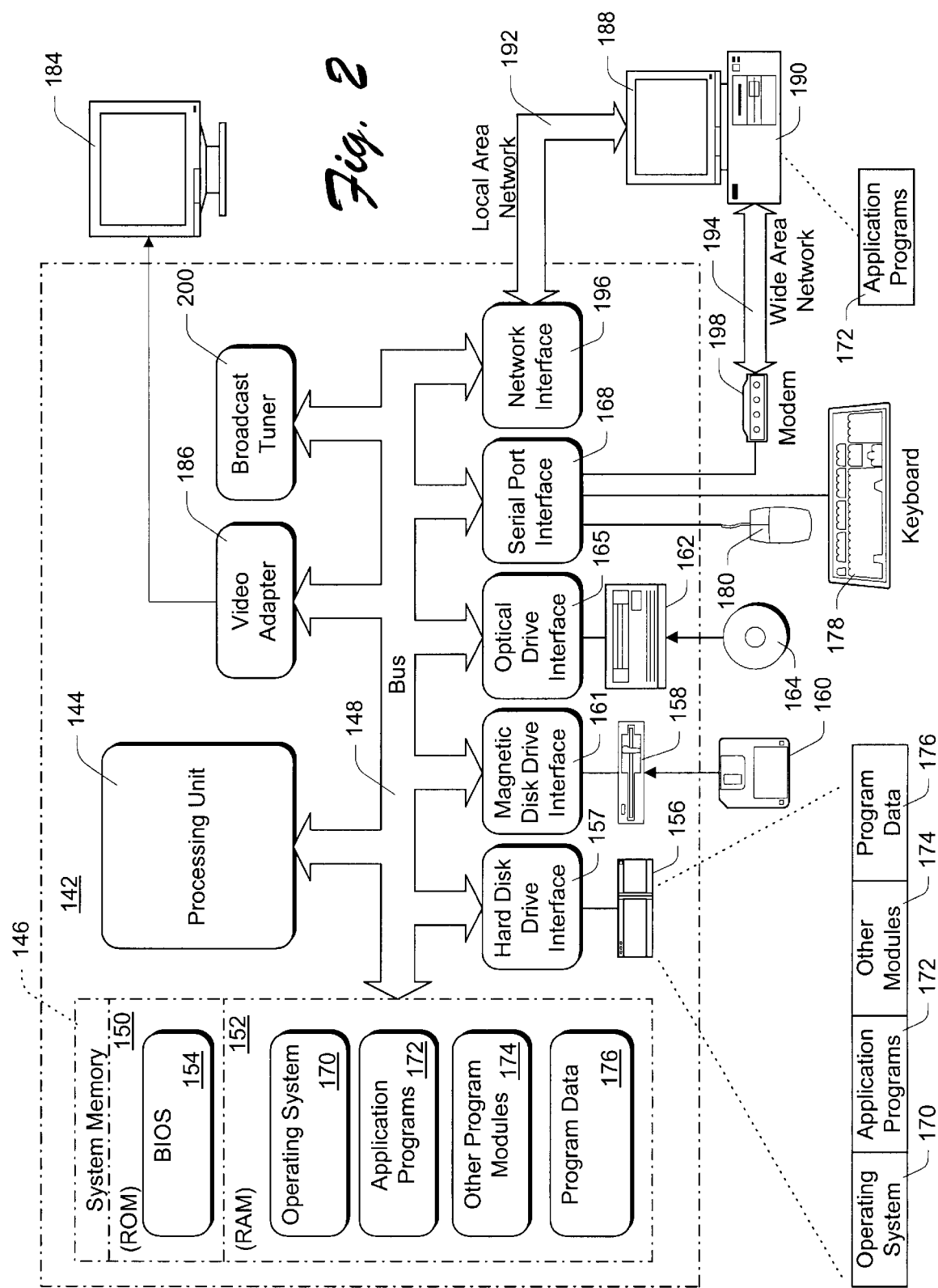
FIG. 2 shows a general example of a computer that can be used in accordance with the invention.

FIG. 2 shows a general example of a computer 142 that can be used in accordance with the invention. Computer 142 is shown as an example of a computer that can perform the functions of rendering system 102 of FIG. 1. Computer 142 includes one or more processors or processing units 144, a system memory 146, and a system bus 148 that couples various system components including the system memory 146 to processors 144.

The bus 148 represents one or more of any of several types of bus structures, including a memory bus or memory controller, a peripheral bus, an accelerated graphics port, and a processor or local bus using any of a variety of bus architectures. The system memory includes read only memory (ROM) 150 and random access memory (RAM) 152. A basic input/output system (BIOS) 154, containing the basic routines that help to transfer information between elements within computer 142, such as during start-up, is stored in ROM 150. Computer 142 further includes a hard disk drive 156 for reading from and writing to a hard disk, not shown, connected to bus 148 via a hard disk driver interface 157 (e.g., a SCSI, ATA, or other type of interface); a magnetic disk drive 158 for reading from and writing to a removable magnetic disk 160, connected to bus 148 via a magnetic disk drive interface 161; and an optical disk drive 162 for reading from or writing to a removable optical disk 164 such as a CD ROM, DVD, or other optical media, connected to bus 148 via an optical drive interface 165. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. A user may enter commands and information into computer 142 through input devices such as keyboard 178 and pointing device 180. Other input devices (not shown) may include a microphone, joystick, game pad, satellite dish, scanner, or the like. These and other input devices are connected to the processing unit 144 through an interface 168 that is coupled to the system bus. A monitor 184 or other type of display device is also connected to the system bus 148 via an interface, such as a video adapter 186. In addition to the monitor, personal computers typically include other peripheral output devices (not shown) such as speakers and printers.

Computer 142 operates in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 2. The logical connections depicted in FIG. 2 include a local area network (LAN) 192 and a wide area network (WAN) 194. Such networking environments are commonplace in offices, enterprise-wide computer networks, intranets, and the Internet. In the described embodiment of the invention, remote computer 188 executes an Internet Web browser program (which may optionally be integrated into the operating system 170) such as the "Internet Explorer" Web browser manufactured and distributed by Microsoft Corporation of Redmond, Wash.

When used in a LAN networking environment, computer 142 is connected to the local network 192 through a network interface or adapter 196. When used in a WAN networking environment, computer 142 typically includes a modem 198 or other means for establishing communications over the wide area network 194, such as the Internet. The modem 198, which may be internal or external, is connected to the system bus 148 via a serial port interface 168. In a networked environment, program modules depicted relative to the personal computer 142, or portions thereof, may be stored in the remote memory storage device. It will be appreciated that the network connections shown are exemplary and other means of establishing a communications link between the computers may be used.

Computer 142 also includes a broadcast tuner 200. Broadcast tuner 200 receives broadcast signals either directly (e.g., analog or digital cable transmissions fed directly into tuner 200) or via a reception device (e.g., via antenna 110 or satellite dish 114 of FIG. 1).

Generally, the data processors of computer 142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Figure 3:
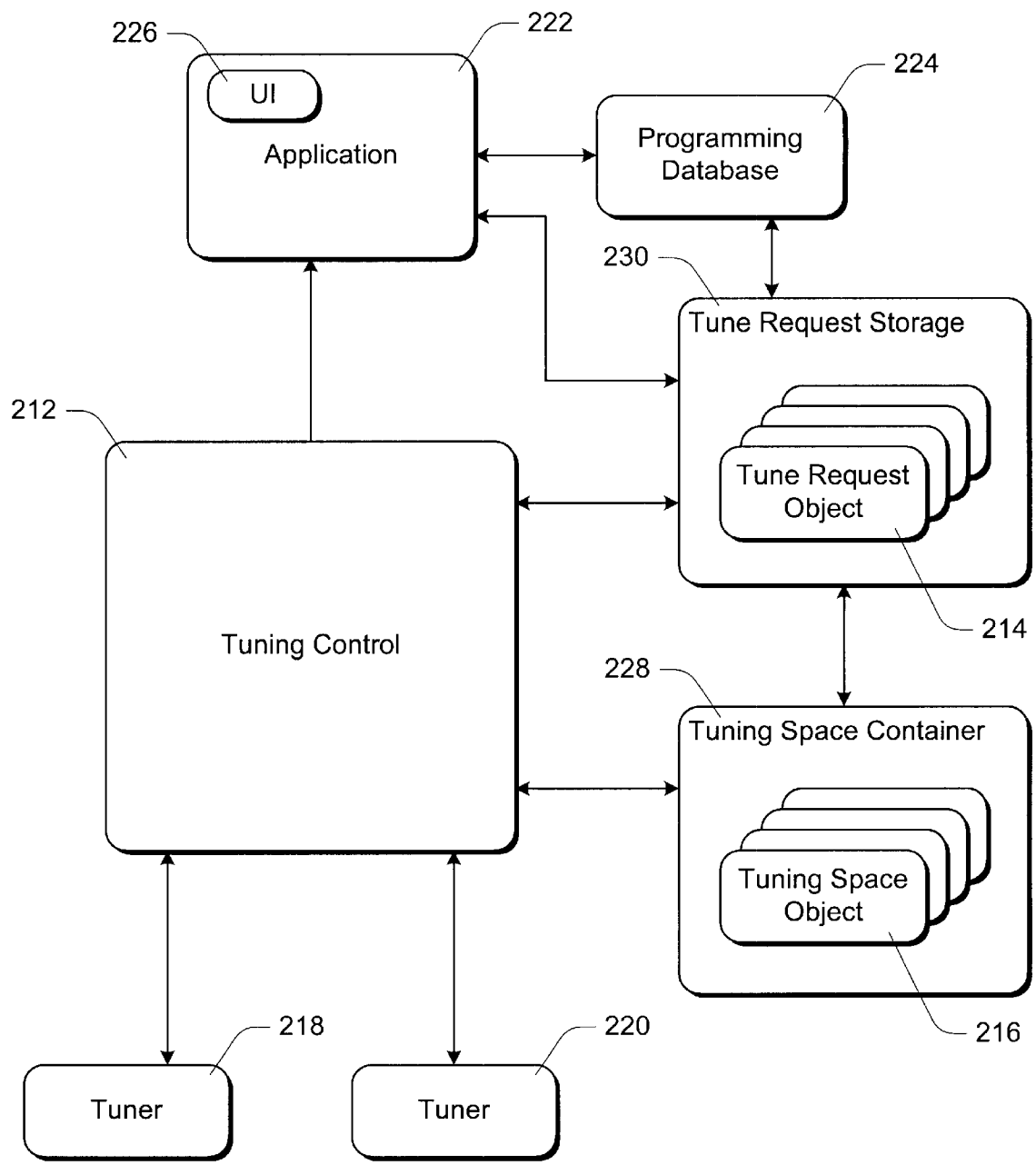
FIG. 3 is a block diagram illustrating an extensible tuning architecture in accordance with one embodiment of the invention.

FIG. 3 is a block diagram illustrating an extensible tuning architecture in accordance with one embodiment of the invention. The tuning architecture can be implemented, for example, on a system 102 of FIG. 1.

The extensible tuning architecture includes a tuning control 212, one or more tune request objects 214, and one or more tuning space objects 216. One or more tuners 218 and 220 are also included. Each tuning space object 216 identifies a particular programming source and a network type for that programming source. Each tune request object 214 identifies a corresponding tuning space object and also includes tuning parameters for a particular one or more components available from the corresponding programming source. In combination, a tune request object 214 and corresponding tuning space object 216 include the necessary information for a tuner 218 or 220 to tune to a particular program from a particular programming source.

The extensible tuning architecture uses tune request descriptors and tuning space descriptors, which are described herein as tune request objects and tuning space objects, respectively. These objects include data fields as well as methods that can be invoked by applications or other objects to perform various functions. Alternatively, the extensible tuning architecture can be implemented in different manners. For example, the tune request descriptors and tuning space descriptors may only store data and additional procedures or functions may be added to implement any necessary methods. Furthermore, additional objects may be used in implementing the extensible tuning architecture, or the tuning space objects and tune request objects may be consolidated into a single object.

Tuning control 212 includes the necessary control modules to access the appropriate tuner 218 or 220 and provide the necessary control information to the appropriate tuner 218 or 220 in order for the tuner to tune, based on a particular tune request object and corresponding tuning space object, to a particular one or more components.

Tuning control 212 can be implemented in any of a variety of different manners, such as using filters in accordance with the "DirectShow" architecture. Additional information regarding the "DirectShow" architecture and "DirectShow" application programming interface is available from Microsoft Corporation of Redmond, Wash. The control modules of tuning control 212 can be implemented in software, firmware, hardware, or a combination thereof. In the illustrated example, tuning control 212 includes one or more of radio frequency (RF) tuning modules, digitizing modules, digital capture modules, demultiplexing modules, and decryption modules. Which of these modules is actually used is dependent on the network type that the program is received on. For example, a demultiplexer would typically not be used if the program is received via an analog cable. Additionally, some of the modules may alternatively be implemented in tuners 218 or 220 rather than in tuning control 212. A control module included in control 212 identifies, for a particular tune request object, which of tuners 218 and 220 can handle the tune request (that is, tune to the desired program) and coordinates the appropriate modules within control 212 to have the tuned-to data routed to the appropriate destination. Which of tuners 218 and 220 can handle a particular request can be pre-programmed into control 212, or alternatively determined dynamically by querying tuners 218 and 220.

One or more applications 222 can communicate with the extensible tuning architecture either directly via the tune request objects 214 or via a programming database 224. Programming database 224 stores information identifying the programs that are available from the various programming sources. This information can be displayed to a user, such as via a user interface (UI) 226 of application 222.

When application 222 wishes to tune to a particular program (e.g., in response to user selection of a programming option displayed on UI 226), application 222 accesses information (e.g., a record or entry) from programming database 224 corresponding to the user's selection. The corresponding information identifies a tune request object 214 corresponding to the user's selection. The corresponding tune request object 214 is transmitted to tuning control 212. Tuning control 212, based on the tune request object 214 and a corresponding tuning space object 216 then identifies the appropriate tuner to handle the request and forwards the tune request object 214 and tuning space object 216 to the appropriate tuner 218. Tune request object 214 may include an identifier of the corresponding tuning space object 216, or alternatively the tuning space object 216 may be included in the tune request object 214.

Alternatively, application 222 may access a tune request object 214 directly rather than through programming database 224. For example, a tune request interface may be exposed to application 222 by tune request objects 214.

Thus, application 222 has no direct communication with tuners 218 or 220. Rather, application 222 is shielded from tuners 218 via the tune request objects 214 and tuning space objects 216. The information that is necessary to identify a particular tuner 218 or 220, as well as for a tuner to tune to a particular set of one or more components, is contained within the tune request objects 214 and the tuning space objects 216.

The architecture illustrated in FIG. 3 is readily extensible, allowing new network types and new programming sources to be made available to application 222 by simply adding the appropriate tune request objects 214 and tuning space objects 216. For example, if a new digital television broadcast standard were to be adopted and put into use by various programming sources, a new tuning space object 216 including the necessary parameters for the new standard would be added to tuning space container 228. Additionally, information necessary to tune to each component of a "channel" for the new source would be added as new tune request objects 214 in tune request storage 230. Application 222 would then be able to access programming provided from programming sources via this new standard by using the appropriate tune request objects 214 and tuning space objects 216—no modifications to application 222 would be necessary.

Application 222 can be any of a wide variety of applications that want to communicate with a tuner 218 or 220, or alternatively obtain information regarding tuning spaces (via tuning space objects 216) or tune requests (via tune request objects 214). Additionally, multiple applications can communicate with the programming database 224 and/or the tune request objects 214 concurrently.

Tuning space objects 216 are created external to the architecture illustrated in FIG. 3. For example, designers or developers of a new network type or a new programming source would create a new tuning space object 216 that includes the necessary information and data for that new network type or programming source.

Tune request objects can be created external to the architecture illustrated in FIG. 3 or alternatively internal thereto. For example, the developers of a new network type or new programming source may also create and populate tune request storage 230 with tune request objects 214 for programs available via the new network type or programming source. Alternatively, a tune request object may be created "on the fly" by programming database 224. For example, only some of the information necessary to create a tune request object (e.g., an identifier of the corresponding tuning space object and a particular "channel" or other program identifier) may be stored in programming database 224. Once a request to tune to a particular program is received from application 222, programming database 224 creates the tune request object and forwards the tune request object to tuning control 212, with additional information as necessary being added to the tune request object by the appropriate one of tuners 218 or 220.

Although discussed herein primarily with reference to selection of a program to be tuned to, a wide variety of requests may be made by application 222 in addition to simply tuning to a particular program. For example, application 222 may implement a "scan" function that allows a user to scan through a range of frequencies for valid signals, pausing on each for a short amount of time, then progressing to the next until the process is canceled. By way of another example, an application 222 may desire to identify the various network types or programming sources that are available (e.g., to notify the user or alternatively provide a "filter" to programs identified in programming database 224).

FIG. 4 is a block diagram illustrating an exemplary tuning space object in accordance with an embodiment of the invention. Although illustrated as a single structure, tuning space object 216 may be a collection of multiple objects. Tuning space object 216 includes a unique identifier 232 that uniquely identifies the tuning space object 216 as well as a user-friendly identifier 234 that identifies tuning space object in a more user-friendly manner (e.g., a more common name, such as "local cable"). Network type 236 identifies the type of network that the tuning space object corresponds to. Examples of network types include analog cable and terrestrial broadcast types (e.g., NTSC (National TV Standards Committee), SECAM (System En Couleur Avec Memoire), PAL (Phase Alternating Line)), digital cable and terrestrial broadcast types (e.g., ATSC (Advanced Television Systems Committee), DVB-T (Digital Video Broadcasting for digital terrestrial television), DVB-C (Digital Video Broadcasting for cable systems)), digital satellite (e.g., DVB-S (Digital Video Broadcasting for satellite services)), etc.

Tuning space object 216 can also optionally include one or more tuning space specific fields 238. Each of these fields 238 includes additional parameters particular to a specific tuning space, such as the channel range. The tuning space specific fields 238 also include the necessary information for a tuner to be able to tune to programs from the corresponding programming source. The exact nature of such information varies depending on the network type. Examples of such information include: channel number to audio and video frequency mappings for analog television broadcasts; mappings of channel name to transponder codes, satellite location, and error coding being used for digital satellite broadcasts; program name to Internet address (or Uniform Resource Locator (URL)) for multimedia programming received via the Internet; etc. Additionally, the actual information maintained for a tuner to be able to tune to programs from the corresponding programming source varies depending on the programming source itself. For example, channels numbers for analog television broadcasts can vary from country to country, channel numbers for analog cable broadcasts can vary from city to city within the U.S.A., etc.

Interface methods 240 are one or more methods that can be accessed by the other objects or applications in the system. Examples of such methods include a method to identify tuner inputs supporting the tuning space, a method to create a tune request object corresponding to the tuning space, etc.

FIG. 5 is a block diagram illustrating an exemplary tune request object in accordance with an embodiment of the invention. Although illustrated as a single structure, tune request object 214 may be a collection of multiple objects. Tune request object 214 includes a tuning space object 252 and one or more component objects 254. Tuning space object 252 can be an identifier of a tuning space object (e.g., a unique identifier of a tuning space object corresponding to the tune request object) or alternatively can be the actual tuning space object (e.g., tuning space object 216 of FIG. 4).

Component objects 254 are one or more identifiers of objects (or alternatively the objects themselves) for the component(s) corresponding to the tune request object 214, such as video, audio, and data components. Different programs may include different components. For example, a television program may include video, audio and data components, whereas a radio program may include only an audio component. Note that the component objects 254 may be initially included in the tune request object 214 (e.g., by programming database 224) or alternatively added to the tune request object 214 by a tuner (e.g., tuner 218 or 220 of FIG. 3), or some objects may be initially included while others are added by the tuner.

While tuning space object 216 of FIG. 4 includes information corresponding to the programming source, tune request object 214 includes information corresponding to a particular program available from that programming source (e.g., in component object(s) 254). Tune request object 214 includes information regarding which components are part of the program, as well as how the tuner is to tune in that particular program from the programming source. The information identifying how the tuner is to tune in a particular program can vary depending on the nature of the programming source. For example, some programming sources are channel-oriented (e.g., analog terrestrial and cable broadcasts), others are name-oriented (e.g., multimedia content may be received via the Internet by URL), etc. The particular channel number, program name, etc. for the program is included in the tune request object 214 and, in combination with the information in tuning space object 216, provides a tuner with the necessary information to tune to the particular program.

The interface methods that are presented by the tuning space objects and the tune request objects allow the application 222 of FIG. 3 to make use of tuners 218 and 220 without specific knowledge as to the network types and program sources for the programming. By maintaining the architecture illustrated in FIG. 3, the specific information regarding how to tune to a particular selected program is shielded from many of the components (including application 222) but is contained within the tune request objects 214 and the tuning space objects 216. These objects can be provided (or made available) to the tuners, thereby allowing the tuners to access the appropriate components.

Figure 6:
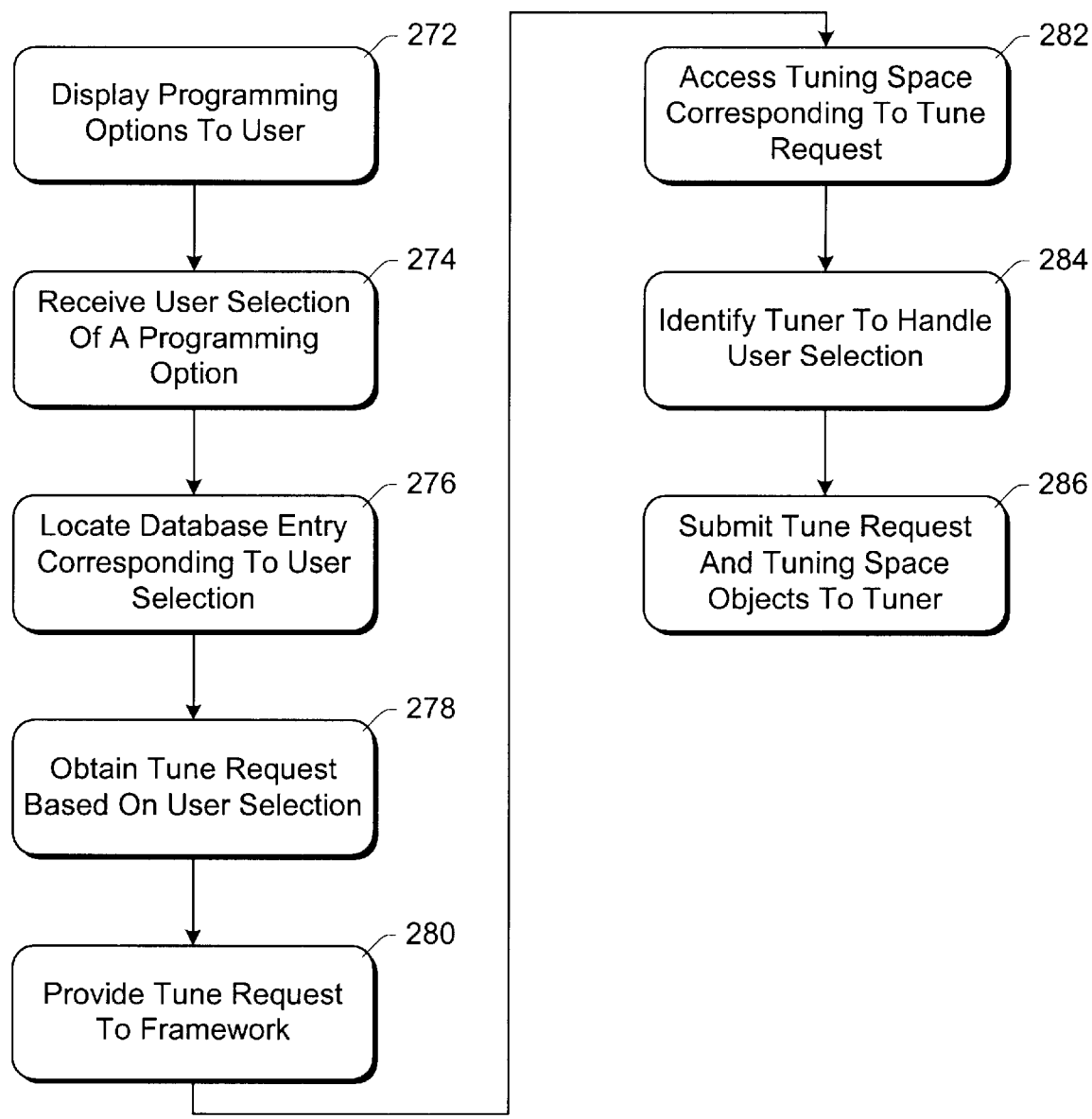
FIG. 6 is a flowchart illustrating an exemplary process for tuning to a particular program using the extensible tuning architecture in accordance with one embodiment of the invention.

FIG. 6 is a flowchart illustrating an exemplary process for tuning to a particular program using the extensible tuning architecture in accordance with one embodiment of the invention. FIG. 6 is described with additional reference to components in FIG. 3.

Initially, application 222 displays programming options to a user (block 272). These programming options are available to application 222 via, for example, programming database 224 and can include programming from multiple different programming sources. Eventually application 222 receives a user selection of a programming option (block 274). Such a user selection can be made in any of a wide variety of manners, such as selection of a program identifier displayed via UI 226.

Upon receipt of the user selection, an entry of database 224 is located that corresponds to the user selection (block 276) and a tune request corresponding to that entry is obtained (block 278). The tune request can be included as part of the entry, or alternatively generated based on information included in the entry (e.g., using an identifier of one of tune request objects 214). This locating and obtaining (blocks 276 and 278) can be performed by application 222, by a software module associated with programming database 224, or a combination thereof.

The tune request is then passed on to tuning control 212 (step 280). The tuning control 212 accesses the tuning space corresponding to the tune request (step 282) and identifies an appropriate tuner 218 or 220 to handle the user selection (step 284). The tuner selected by tuning control 212 is a tuner that is capable of tuning to programming from the tuning space corresponding to the tune request. Once an appropriate tuner is selected, tuning control 212 submits the tune request and tuning space objects to the selected tuner (step 286). The tune request and tuning space objects together provide the necessary information for the tuner to tune in the requested program, with tuning control 212 providing the data path for the tuned program information (e.g., audio, video, and data components) to application 222 for presentation to the user.

The tuning space objects and tune request objects can be implemented in any of a wide variety of manners. Furthermore, the information maintained in such objects is dependent, at least in part, on the nature of the programming source. For example, different information is maintained in order to tune to an analog broadcast channel than is maintained in order to tune to a digital satellite channel. The attached appendix that forms part of this document describes objects that are used in accordance with one implementation of the invention.

Figure 7A:
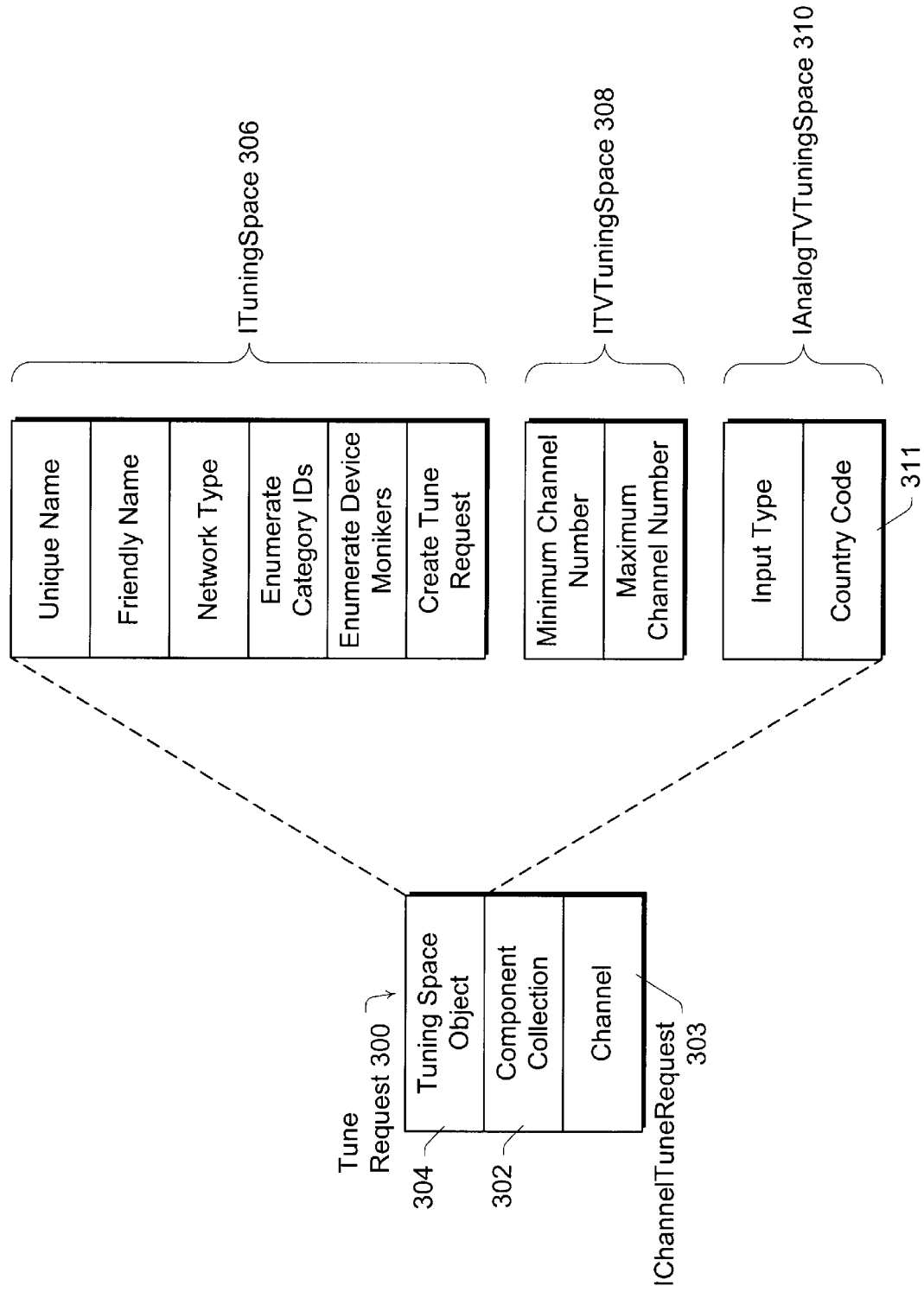
FIGS. 7A and 7B illustrate an exemplary tune request for a broadcast analog television program in accordance with one implementation of the invention.
Figure 7B:
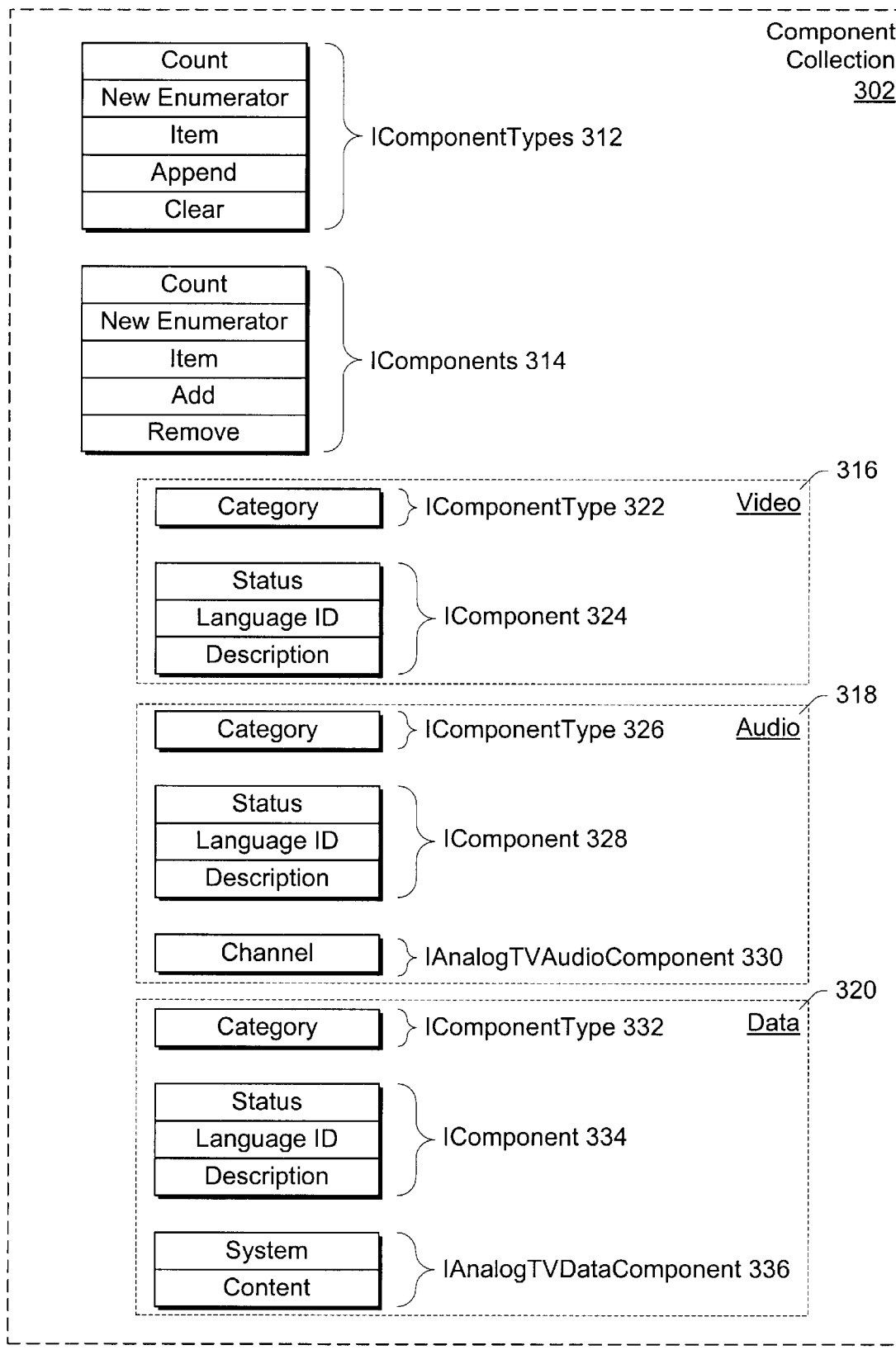

FIGS. 7A and 7B illustrate an exemplary tune request for a broadcast analog television program in accordance with one implementation. The example of FIGS. 7A and 7B include various objects from the attached appendix.

As illustrated in FIG. 7A, a tune request 300 includes a tuning space object 301, a component collection 302, and an IChannelTuneRequest object 303. The various information and methods maintained in tuning space object 301 are illustrated in FIG. 7A, while the information and methods maintained in component collection 302 are illustrated in FIG. 7B. The IChannelTuneRequest object 303 includes the channel number that is to be tuned to.

Tuning space object 301 includes three different objects, referred to as "ITuningSpace", "ITVTuningSpace", and "IAnalogTVTuningSpace". ITuningSpace 306 includes various basic information and methods that are included in virtually all tuning spaces. ITVTuningSpace 308 includes information that is particular to sources of television programming, while IAnalogTVTuningSpace 310 includes information that is particular to sources of analog television sources. The IAnalogTVTuningSpace object 310 includes a country code field 311 that can be used by a tuner to map (based on a mapping maintained by the tuner) the channel number in IChannelTuneRequest object 303 to a particular video and audio frequency. Alternatively, rather than including country code field 311 in IAnalogTVTuningSpace object 310, the actual video and audio frequency to channel mapping could be included in IAnalogTVTuningSpace object 310.

Component collection 302, illustrated in more detail in FIG. 7B, includes an IComponentTypes object 312 and an IComponents object 314, each of which includes various basic information and methods that are included for virtually all components. Additional component-specific information is also included, which is video information 316, audio information 318, and data information 320.

Video information 316 includes an IComponentType object 322 and an IComponent object 324 that provide information describing the video component of the program corresponding to tune request 300. Audio information 318 includes an IComponentType object 326 and an IComponent object 328 that provide information describing the audio component of the program corresponding to tune request 300. Audio information 318 further includes an IAnalogTVAudioComponent 330 which provides information specific to audio components from analog television programming sources.

Similarly, data information 320 includes an IComponentType object 332 and an IComponent object 334 that provide information describing the data component of the program corresponding to tune request 300. Data information 320 further includes an IAnalogTVDataComponent 330 which provides information specific to data components from analog television programming sources.

Additionally, various parameters for a tune request may not be known to application 222 at the time the initial tune request is submitted. For example, a particular program may include multiple audio components, each including audio for a program in a different language. However, once the tune request object is created and passed to a tuner 218 or 220, the tune request object can be used to identify to application 222 what additional parameters may be set by application 222.

For example, component collection 302 may be empty when the tune request 300 is first obtained by the application. In this case, the tuner 218 or 220 would rely on a collection of preferred component types to make default selections. After the tune operation completes, tuner 218 or 220 would determine the available components and place them in the component collection 302. The application 222 could then retrieve the tune request 300 and examine each IComponent object in the collection. The Status property indicates whether the component is Active, Inactive, or Unavailable. The Language ID and Description properties can be used by UI 226 to permit user selection. By updating the Status property, the individual components in the collection can be selected and unselected.

Such component changes are performed dynamically based on the tune request. Application 222 need not have, and typically does not have, any information regarding what components are available from a particular programming source. However, once the source is tuned to, such information is available to application 222 via the tune request object and application 222 can select from the various components at that time (or subsequently change components during playback).

CONCLUSION

Thus, an extensible framework for tuning to programming sources is described herein. Applications that are to make use of the programs available from the programming sources are advantageously shielded from the tuning space objects and tune request objects that identify how a tuner is to tune to the various programming sources. Thus, programming sources can be added, deleted, changed, etc. without requiring any modification to the applications using the content received from the programming sources.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A system comprising:
   a tuning space container that includes a plurality of tuning space objects identifying programming sources and to which additional tuning space objects can be added, wherein each of the plurality of tuning space objects includes an interface method accessible to an application in the system;
   a tune request container that includes a plurality of tune request objects and to which additional tune request objects can be added, wherein each of the plurality of tune request objects identifies tuning parameters for a particular program and corresponds to one of the tuning space objects; and
   a tuning control having a plurality of filters that are configured based on the contents of selected ones of the plurality of tuning space objects and the plurality of tune request objects, wherein the selected ones of the plurality of tuning space objects and the plurality of tune request objects are passed to the tuning control, and wherein the plurality of tuning space objects and the plurality of tune request objects are objects other than filters.

2. A system as recited in claim 1, further comprising:
   a plurality of tuners; and
   a tuning control to identify, based on a particular tuning space object, which of the plurality of tuners is to handle a particular tune request.

3. A system as recited in claim 1, further comprising an application to present to a user programming from the programming sources, wherein the application requests data for a particular program one of the plurality of tune request objects.

4. A system as recited in claim 1, wherein each of the plurality of tuning space objects includes a unique identifier, a user-friendly identifier, a network type identifier, a method to enumerate portions of a tuning control that support the tuning space described by the tuning space object, a method to enumerate device monikers representing tuner inputs that support the tuning space described by the tuning space object, and a method to create a tune request object.

5. A system as recited in claim 1, wherein at least one of the plurality of tuning space objects includes an identifier of the lowest channel number for the tuning space described by the tuning space object and an identifier of the highest channel number for the tuning space described by the tuning space object.

6. A system as recited in claim 5, wherein the at least one tuning space object further includes an identifier of a step size between valid channels.

7. A system as recited in claim 1, wherein at least one of the plurality of tuning space objects is for an analog television tuning space and includes an identifier of a signal input type for the tuning space described by the tuning space object, and a country code of the tuning space.

8. A system as recited in claim 7, wherein the identifier of the signal input type identifies either an antenna input type or a cable input type.

9. A system as recited in claim 1, wherein at least one of the plurality of tune request objects includes one of the plurality of tuning space objects and a collection of component objects.

10. A system as recited in claim 1, wherein at least one of the plurality of tune request objects includes a channel to be tuned to.

11. A system as recited in claim 1, wherein at least one of the plurality of tune request objects is for a digital video broadcasting tune request and includes a locator object, an original network identifier, a transport stream identifier, and a service identifier.

12. A system as recited in claim 11, wherein the locator object is a terrestrial digital video broadcasting object including a center frequency identifier, a bandwidth identifier, a constellation identifier, a hierarchy scheme identifier, a Binary Convolutional Coding error correction code rate identifier, a guard interval identifier, a transmission mode identifier, and an additional frequency identifier.

13. A system as recited in claim 11, wherein the locator object is a cable digital video broadcasting object, including a frequency identifier, a Forward Error Correction (FEC) scheme identifier, a modulation identifier, a symbol rate identifier, and a Binary Convolutional Coding error correction code rate identifier.

14. A system as recited in claim 11, wherein the locator object is a satellite digital video broadcasting object, including a frequency identifier, an orbital position identifier, a satellite west-east position identifier, an antenna polarization identifier, a modulation scheme identifier, a symbol rate identifier, and a Binary Convolutional Coding error correction code rate identifier.

15. A system as recited in claim 1, wherein at least one of the plurality of tune request objects includes a component type object corresponding to a component of a program and having an identifier of a category of the component.

16. A system as recited in claim 1, wherein at least one of the plurality of tune request objects includes an object corresponding to a component of a program and having an operating system-specific identifier of a language of the component.

17. A system as recited in claim 1, wherein at least one of the plurality of tune request objects includes a collection of component objects of different types and a component types object having an identifier of the number of component types in the collection, an identifier of all component types in the collection, an item method to allow access to a component type via an index value, an append method to add a component type to the collection, and a clear method to remove all component types from the collection.

18. A system as recited in claim 1, wherein at least one of the plurality of tune request objects includes an object corresponding to a component of a program and having a status indicator identifying whether the component is active, a language identifier indicating the language the component uses, and a description of the component.

19. A system as recited in claim 1, wherein at least one of the plurality of tune request objects includes an object corresponding to a component of a program and having an audio channel identifier.

20. A system as recited in claim 1, wherein at least one of the plurality of tune request objects includes an object corresponding to a component of a program and having a system identifier and a content identifier.

21. A system as recited in claim 1, wherein at least one of the plurality of tune request objects includes a digital video broadcasting object corresponding to a component of a program and having a packet identifier for the component, a component tag identifier for the component, and an identifier of whether the packet identifier and the component tag identifier are valid.

22. A system as recited in claim 1, wherein at least one of the plurality of tune request objects includes a collection of component objects and a component object having an identifier of the number of component objects in the collection, an identifier of all components in the collection, an item method to allow access to a component via an index value, an append method to add a component to the collection, and a clear method to remove all components from the collection.

23. A method comprising:
receiving, from an application program, a request to be provided with data for a particular program;
identifying a tune request descriptor corresponding to the particular program, the tune request descriptor identifying a programming source for the particular program and tuning parameters for the particular program, the tune request descriptor including an interface method accessible to the application program;
passing the identified tune request descriptor to a tuning control, wherein the tuning control includes a plurality of filters, and wherein the tune request descriptor is not a filter; and
passing, by way of the tuning control, the tune request descriptor to a tuner.

24. A method as recited in claim 23, wherein the identifying comprises accessing a previously created and stored tune request descriptor.

25. A method as recited in claim 23, wherein the identifying comprises creating the tune request descriptor.

26. A method as recited in claim 23, wherein the tune request descriptor includes a tune request object including tuning parameters for the particular program.

27. A method as recited in claim 26, wherein the tuning parameters include one or more of an analog frequency, a digital channel, a digital sub-channel, a server location, and a file identifier.

28. A method as recited in claim 26, wherein the tune request descriptor further includes a tuning space object that identifies a programming source for the particular program.

29. A method as recited in claim 28, wherein the tuning space object further identifies a channel to frequency mapping for channels available from the programming source.

30. One or more computer-readable memories containing a computer program that is executable by a processor to perform the method recited in claim 23.

31. A computer-readable medium having stored thereon a data structure that is to be used by filters of a filter graph but that is not a filter, comprising:
a first data field containing an identifier of a tuning space;
a second data field containing an identifier of a network type of the tuning space;
a creation method to create a tune request descriptor for a particular program based on the tuning space and the network type;
and wherein the data structure is a tuning space descriptor that includes an interface method accessible to an application, and wherein both the tuning space descriptor and a tune request descriptor are not filters but are passed to a tuner by way of the filters in a tuning control.

32. A computer-readable medium as recited in claim 31, wherein the first data field comprises a unique identifier of the tuning space, the data structure further comprising a third data field containing a user-friendly identifier of the tuning space.

33. A computer-readable medium as recited in claim 31, wherein the network type comprises one of the following: analog cable, analog terrestrial broadcast, digital cable, digital terrestrial broadcast, and digital satellite.

34. A computer-readable medium as recited in claim 31, wherein the data structure further includes:
a method to enumerate portions of a tuning control that support the tuning space described by the tuning space object; and
a method to enumerate device monikers representing tuner inputs that support the tuning space described by the tuning space object.

35. A system comprising:
an application to present programming including at least one of an audio component, a video component, and a data component; and
a tuning space descriptor and a tune request descriptor, independent of the application, that together indicate to a tuner how to tune to a selected program, wherein the tuning space descriptor includes an interface method accessible to the application, and wherein both the tuning space descriptor and the tune request descriptor are not filters but are passed to the tuner by way of a plurality of filters in a tuning control.

36. A system as recited in claim 35, wherein the tuning space descriptor identifies a programming source for the selected program.

37. A system as recited in claim 36, wherein the tuning space descriptor further includes a channel to frequency mapping for channels available from the programming source.

38. A system as recited in claim 35, wherein the tuning space descriptor comprises a tuning space object and wherein the tune request descriptor comprises a tune request object that includes the tuning space object.

39. A system as recited in claim 35, wherein the tune request descriptor identifies tuning parameters for the selected program.

40. A system as recited in claim 39, wherein the tuning parameters include one or more of an analog frequency, a digital channel, a digital sub-channel, a server location, and a file identifier.

* * * * *

UNITED STATES PATENT AND TRADEMARK OFFICE
CERTIFICATE OF CORRECTION

PATENT NO.    : 6,628,301 B1
DATED         : September 30, 2003
INVENTOR(S)   : Acton et al.

It is certified that error appears in the above-identified patent and that said Letters Patent is hereby corrected as shown below:

<u>Title page,</u>
Item [75], Inventor, replace "Kirland, WA" with -- Kirkland, WA --.

Signed and Sealed this

Seventeenth Day of August, 2004

JON W. DUDAS
*Acting Director of the United States Patent and Trademark Office*